US009854004B2

(12) United States Patent
Bharadwaj

(10) Patent No.: US 9,854,004 B2
(45) Date of Patent: Dec. 26, 2017

(54) SYSTEMS AND METHODS FOR MANAGING DIFFERENT TYPES OF REGISTRATIONS FOR IMS SERVICES ON SIMS OF A WIRELESS COMMUNICATION DEVICE

(71) Applicant: QUALCOMM Incorporated, San Diego, CA (US)

(72) Inventor: Murali Bhaskara Rao Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 729 days.

(21) Appl. No.: 14/522,636

(22) Filed: Oct. 24, 2014

(65) Prior Publication Data

US 2015/0327207 A1     Nov. 12, 2015

Related U.S. Application Data

(60) Provisional application No. 61/991,100, filed on May 9, 2014.

(51) Int. Cl.
*H04W 60/00*      (2009.01)
*H04W 8/04*      (2009.01)
(Continued)

(52) U.S. Cl.
CPC ......... *H04L 65/1016* (2013.01); *H04W 4/003* (2013.01); *H04W 8/04* (2013.01);
(Continued)

(58) Field of Classification Search
CPC ............. H04L 65/1016; H04L 65/1073; H04L 65/1069; H04L 65/1006; H04L 65/1066;
(Continued)

(56) References Cited

U.S. PATENT DOCUMENTS 8,441,985 B2    5/2013    Kim et al.
8,908,597 B2 *   12/2014    Sedlacek ............. H04L 65/1073
                                                    370/328
(Continued)

FOREIGN PATENT DOCUMENTS

| WO | 2009026264 A1 | 2/2009 |
| WO | 2010141792 A1 | 12/2010 |
| WO | 2011028518 A2 | 3/2011 |

OTHER PUBLICATIONS

International Search Report and Written Opinion—PCT/US2015/024961—ISA/EPO—dated Jul. 1, 2015.

*Primary Examiner* — Lester Kincaid
*Assistant Examiner* — Gary Lafontant
(74) *Attorney, Agent, or Firm* — The Marbury Law Group

(57) ABSTRACT

Methods and devices are disclosed for managing Internet Protocol Multimedia Subsystem (IMS) service registration on a wireless communication device having at least one SIM that supports IMS services. The wireless communication device may access network operator policies stored in the SIM(s), and identify enabled IMS services for each SIM. The wireless communication device may also identify, based on the accessed network operator policies, a registration type for each enabled IMS service on each SIM, determine whether to perform a single registration or a dual IMS registration for each of the at least one SIM, perform the determined registration using the accessed network operator policies, and maintain registration of the enabled IMS services for each SIM.

30 Claims, 9 Drawing Sheets

(51) Int. Cl.
  *H04L 29/06* (2006.01)
  *H04W 4/00* (2009.01)
  *H04W 88/06* (2009.01)
  *H04W 8/18* (2009.01)
  *H04L 29/08* (2006.01)

(52) U.S. Cl.
  CPC ....... *H04W 60/005* (2013.01); *H04L 65/1073* (2013.01); *H04L 67/30* (2013.01); *H04W 8/18* (2013.01); *H04W 8/183* (2013.01); *H04W 88/06* (2013.01)

(58) Field of Classification Search
  CPC ..... H04L 69/329; H04L 67/306; H04L 67/02; H04L 29/12188; H04L 61/1588; H04L 63/0478; H04L 63/168; H04L 65/103; H04L 65/604
  See application file for complete search history.

(56) References Cited

U.S. PATENT DOCUMENTS

| | | |
|---|---|---|
| 2006/0072523 A1 | 4/2006 | Richardson et al. |
| 2006/0286980 A1 | 12/2006 | Hua |
| 2010/0150133 A1* | 6/2010 | Witzel et al. |
| 2010/0232368 A1* | 9/2010 | Bogner ............. H04L 29/12188 370/329 |
| 2012/0115477 A1 | 5/2012 | Ali et al. |
| 2012/0307621 A1 | 12/2012 | Zawaideh et al. |
| 2013/0044709 A1 | 2/2013 | Adjakple et al. |

\* cited by examiner

SYSTEMS AND METHODS FOR MANAGING DIFFERENT TYPES OF REGISTRATIONS FOR IMS SERVICES ON SIMS OF A WIRELESS COMMUNICATION DEVICE

RELATED APPLICATIONS

This application claims the benefit of priority to U.S. Provisional Patent Application No. 61/991,100, entitled "Systems and Methods for Managing Different Types of Registrations for IMS Services on SIMs of a Wireless Communication Device" filed May 9, 2014, the entire contents of which are hereby incorporated herein by reference.

BACKGROUND

Increasingly, wireless communication devices may employ a variety of methods for achieving network connections, and enable users to access multiple services from different network operators. Since the number and type of devices has grown dramatically, and each device category, manufacturer, and service may have a wide range of device platforms and operating systems, efficiency in providing multiple service configuration options to the same or different users remains very important for network operators. Further, streamlining different service configurations on a user device improves user experience. These and other improvements may be realized in new network standards, such as Long Term Evolution (LTE).

LTE is a mobile network standard for wireless communication of high-speed data developed by the 3GPP (3rd Generation Partnership Project) and specified in its Release 8 document series. In contrast to the circuit-switched (CS) model of cellular network standards, LTE has been designed to support only packet-switched (PS) services. Multimedia services in LTE include those that are supported by the IP Multimedia Subsystem (IMS), which is an access-independent framework. However, network operators may still be limited in the configurations that may be supported because they are restricted by the lack of a corresponding platform/client in user devices with the ability to simultaneously establish, manage and switch among different IMS service configurations for a plurality of IMS services on a device.

SUMMARY

Systems, methods, and devices of various embodiments enable a wireless communication device on which at least one subscriber identification module (SIM) supports Internet Protocol Multimedia Subsystem (IMS) services to manage the registration of the IMS services for the at least one SIM. Management of registration of the IMS services may include accessing network operator policies stored in the at least one SIM, identifying enabled IMS services for each of the at least one SIM, identifying, based on the access network operator policies, a registration type for each enabled IMS service on each of the at least one SIM, determining whether to perform a single registration or a dual registration for the at least one SIM, performing the determined registration using the accessed network operator policies, and maintaining registration of the enabled IMS services for each of the at least one SIM.

In some embodiment systems, methods and devices, determining whether to perform a single registration or a dual registration for each of the at least one SIM may be based on whether the registration type for any enabled IMS service on each of the at least one SIM requires an Internet packet data network (PDN).

In some embodiment systems, methods and devices, performing the determined registration may include setting up a single registration for a SIM in response to determining that the registration types for the enabled IMS services on the SIM do not require an Internet PDN, and setting up a dual registration on the SIM in response to determining that the registration type for at least one enabled IMS services on the SIM requires an Internet PDN. In some embodiment systems, methods and devices, setting up the single registration may include setting up a registration for the enabled IMS services on an IMS PDN. Various embodiments may include triggering IMS enablers to register feature tags using the registration on the IMS PDN.

In some embodiment systems, methods and devices, setting up the dual registration may include setting up each separate registration on each of an IMS PDN and an Internet PDN. Various embodiments may include triggering IMS enablers to register feature tags using the registration on at least one of the IMS PDN and the Internet PDN.

Various embodiments may include identifying roaming policies for each IMS service enabled on the at least one SIM based on the accessed network operator policies. In some systems, methods and devices, maintaining registration of the enabled IMS services for each of the at least one SIM may include determining whether the wireless device has roamed into a visited network, and in response to determining that the wireless device has roamed into a visited network, determining whether a roaming policy for one or more IMS services enabled on the at least one SIM is triggered by the visited network, and adjusting the registration for the one or more IMS services in response to determining that the roaming policy for the one or more IMS services is triggered by the visited network.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
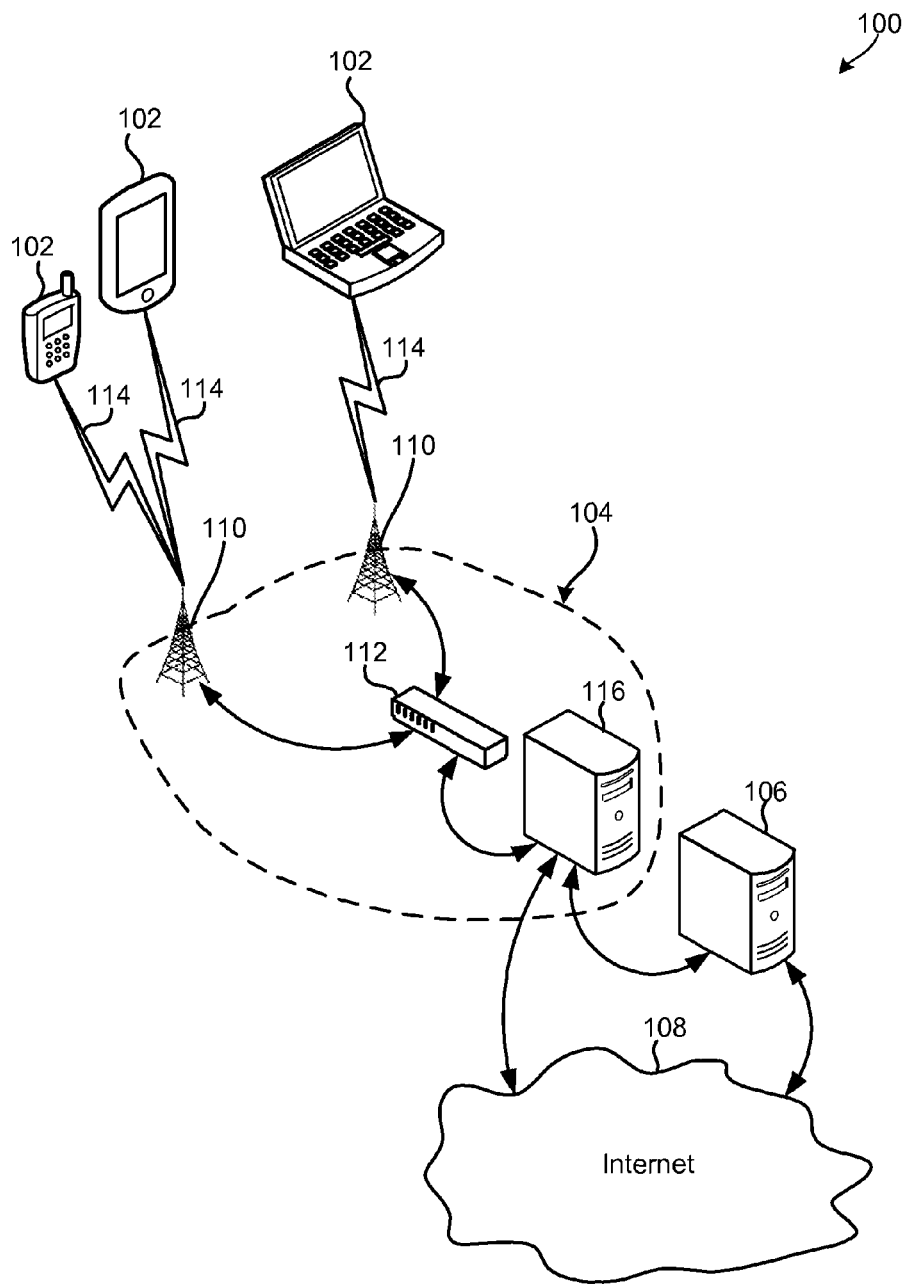
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

The terms "SIM," "SIM card," "USIM," "ISIM," "UICC," and "subscriber identification module" are used interchangeably herein to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

The terms "multi-SIM wireless communication device," "multi-SIM wireless device," "dual-SIM wireless communication device," "dual-SIM dual active device," and "DSDA device" are used interchangeably herein to describe a wireless device that is configured with more than one SIM and is capable of independently handling communications with networks of all subscriptions.

The terms "wireless network," "cellular network," "system," "public land mobile network," and "access network" are used interchangeably herein to describe a wireless network of a carrier associated with a wireless device and/or subscription on a wireless device, and/or its roaming partners.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

Wireless communication networks are widely deployed to provide various communication services, such as voice, packet data, broadcast, messaging, etc. These wireless networks may be capable of supporting communication for multiple users by sharing the available network resources. Examples of such wireless networks may include Global System for Mobile Communications (GSM) networks, Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), cdma2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices.

The Long Term Evolution (LTE) access solution is based on the evolution of the Universal Mobile Telecommunications System (UMTS) radio access through the Evolved Universal Terrestrial Radio Access Network (E-UTRAN). LTE together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely IP based, and both real time services and datacom services are carried by the IP protocol.

LTE uses Orthogonal Frequency Division Multiple Access (OFDMA) technologies, and is an all-IP system that provides an end-to-end IP connection from the mobile equipment to the core network. Applications in LTE are supported by the IP Multimedia Subsystem (IMS), which is a standardized architectural framework for IP-based multimedia services.

The standardized IMS architecture facilitates development and deployment of multiple types of multimedia services. Some considerations addressed by IMS include interoperability, end-to-end service, and security. IMS has been positioned on top of network layers to make it access and device independent—that is IMS services may be implemented on a variety of different end user devices, including mobile phones, personal computers, set top boxes, modems, etc.

The IMS architecture allows operators to offer carrier grade services to be offered on packet-switched networks. Examples of services that have been standardized on top of IMS include Open Mobile Alliance (OMA) presence and group list management, Push-to-Talk over Cellular (PoC), Instant Messaging, and TISPAN/3GPP multimedia telephony for IMS (MMTel). Other IMS services that have been developed for deployment as next-generation LTE services include Voice over LTE (VoLTE) and Video Telephony (VT). Services such as VoLTE may be particularly beneficial by allowing a device to camp on LTE service for both voice and data communications, instead of requiring a switch or fallback to a circuit-switched network.

Other applications have been developed that provide carrier grade data services controlled by operators. For example, the Rich Communications Suite (RCS) is an applications suite that provides carrier grade video and file sharing, instant messaging, and other data applications using IP-based solutions that are compatible across devices and networks. For example, enhanced messaging services generally provide a large number of messaging options including chat, location sharing and file sharing, and enhanced calling services generally provide multimedia content sharing during a voice call, and video calling.

Typically, operators offer RCS as data services over the Internet through an Internet packet data network (PDN). However, RCS may also be deployed as IMS services using an IMS PDN. Therefore, it may be beneficial for various operators to have a choice of running RCS services over an existing Internet PDN or moving RCS services onto an IMS PDN. For example, an operator may prefer to run RCS services along with other IMS services using a single IMS PDN in order to scale down network resources, simplify billing, etc.

Various embodiments may allow multiple IMS registration options for services on a wireless device, which may be flexibly configured by operators and dynamically managed by the device. In this manner, various embodiments may allow registration of IMS services on any of the different combinations of requirements that may be provided by an operator or resulting from limited features on the device. In particular, various embodiments may enable single or dual IMS service registration, corresponding to services that may be provided by an Internet PDN as well as an IMS PDN. Further, various embodiments may enable different radio access technologies to be used to access IMS services, which may be configured by the operator. Further, various embodiments may separately manage IMS service registration for each SIM on a multi-SIM device.

In order to provide and manage the variety of registration options for IMS services, various embodiments implement a single Core IMS protocol stack on the modem processor(s) of the wireless device. Various embodiments enable all IMS services to be managed by the single IMS stack running on the modem. Because of the standards set forth for IMS that require the use of Internet Protocol Security (IPSec) to protect session initiation protocol (SIP) messages exchanged between the wireless device and the P-CSCF as part of IMS registration, management by the Core IMS protocol stack may be very secure and therefore beneficial to the device. Such registration management on the modem processor may also be beneficial since the modem processor is able to interact directly with the SIM.

In various embodiments, a registration entity of the Core IMS protocol stack may be configured to access operator policies stored on each SIM to identify registration policy information for that SIM, and perform IMS registration for all IMS services enabled by that SIM according to the registration policy information.

Further, some services may be running on an application processor, which may not be configured to establish an IPSec endpoint. The single Core IMS stack in the various embodiments may provide procedures for using the IPSec endpoint on the modem to register IMS services that are running on the application processor.

Various embodiments may be implemented within a variety of communication systems, such as the example communication system 100 illustrated in FIG. 1. The communication system 100 may include one or more wireless devices 102, a telephone network 104, and network servers 106 coupled to the telephone network 104 and to the Internet 108. In some embodiments, the network server 106 may be implemented as a server within the network infrastructure of the telephone network 104.

A typical telephone network 104 may include a plurality of cell base stations 110 coupled to a network operations center 112, which operates to connect voice and data calls between wireless devices 102 (e.g., tablets, laptops, cellular phones, etc.) and other network destinations, such as via telephone land lines (e.g., a POTS network, not shown) and the Internet 108. The telephone network 104 may also include one or more servers 116 coupled to or within the network operations center 112 that provide a connection to the Internet 108 and/or to the network servers 106. Communications between the wireless devices 102 and the telephone network 104 may be accomplished via two-way wireless communication links 114, such as GSM, UMTS, EDGE, 4G, 3G, CDMA, TDMA, LTE, and/or other communication technologies.

Figure 2:
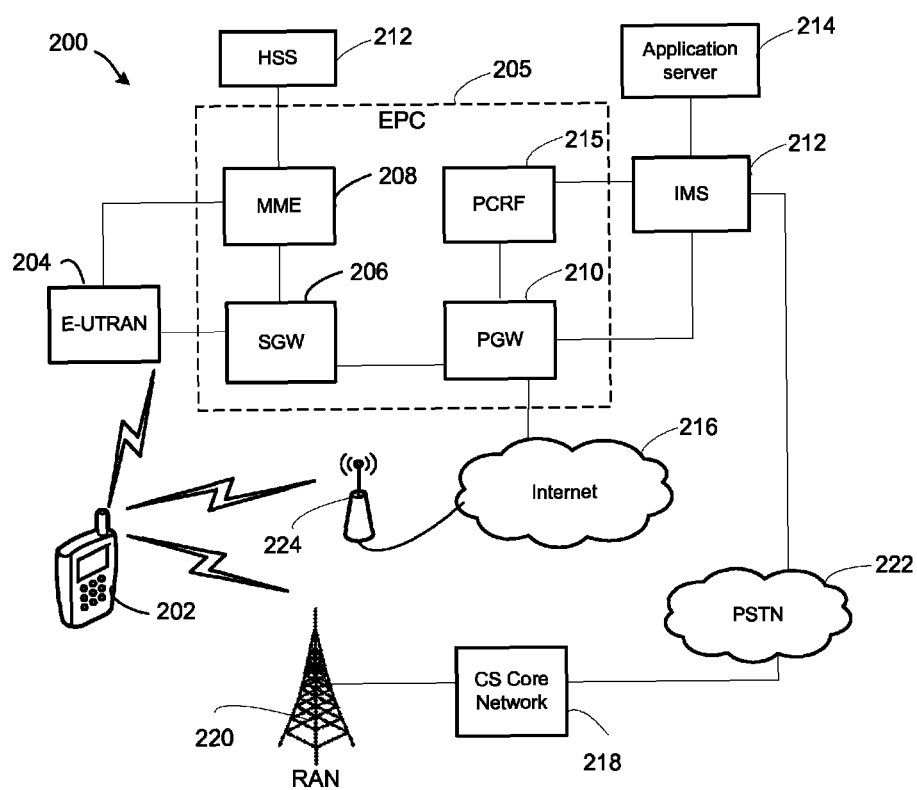
FIG. 2 is a block diagram of a network architecture suitable for use with the various embodiments.

FIG. 2 illustrates components of an Evolved Packet System (EPS) network 200. With reference to FIGS. 1-2, in the EPS network 200, the wireless device 102 may be connected to a LTE access network, E-UTRAN 204. In the various embodiments, the E-UTRAN 204 may be a network of LTE base stations, eNodeBs.

The E-UTRAN 204 may connect to an Evolved Packet Core (EPC) 205 by connecting to a Serving Gateway (SGW) 206 and to a Mobility Management Entity (MME) 208. The MME 208, which may also be logically connected to SGW 206, may handle tracking and paging of the wireless device 102 and security for E-UTRAN access on the EPC 205. The MME 208 may be linked to a Home Subscriber Server (HSS) 212, which may support a database containing user subscription, profile, and authentication information.

The SGW 206 may route incoming and outgoing IP packets for the wireless device 102 via the LTE access network and external IP networks (i.e., packet data networks (PDNs)). The SGW 206 may also provide an anchor point for handover between eNodeBs. The SGW 206 may be logically connected to a PDN Gateway (PGW) 210, which may route packets to and from PDNs to form a connection between the EPC and various PDNs, for example, IP Multimedia Subsystem (IMS) 212. The IMS 212 may connect with one or more application servers 214 to execute IMS specific services. The PGW 210 may be logically connected to a Policy Charging and Rules Function (PCRF) 215, a software component of the EPC 205 that may enforce minimum quality of service parameters, and manage and control data sessions. The PGW 210 may also provide connections with other public or private networks on the Internet 216.

In the various embodiments, in addition to the LTE access network, the wireless device 102 may be configured to connect independently to various access networks that provide at least voice services through the switched telephone network (PSTN) 222. In particular, the wireless device 102 may connect to a legacy CS core network 218 through a radio access network (RAN) 220 that provides at least voice service through the public switched telephone network (PSTN) 222. The wireless device 102 may further connect to other Internet Protocol (IP) based networks, such as a WLAN, over a separate connection to the Internet 216 via an LTE system (e.g., access point 224).

Some or all of the wireless devices 102 may be configured with multi-mode capabilities and may include multiple transceivers for communicating with wireless networks over different wireless links/radio access technologies (RATs). For example, the wireless device 102 may be configured to communicate over multiple wireless data networks on different subscriptions, such as in a dual-SIM wireless device. In some embodiments, the wireless device 102 may be configured with dual-SIM dual active (DSDA) capability, which may enable a dual-SIM wireless communication device to simultaneously participate in two independent communications sessions, generally though independent transmit/receive chains. In other embodiments, the wireless device 102 may be configured with dual-SIM dual-standby capability (DSDS), which enables a dual-SIM wireless communication device to share a transmit/receive chain and to simultaneously monitor for pages in idle mode until one SIM begins a communication.

For clarity, while the techniques and embodiments described herein relate to a wireless device configured with at least one LTE subscription, they may be extended to subscriptions on other radio access networks (e.g., UMTS/WCDMA, GSM, CDMA, etc.).

Figure 3:
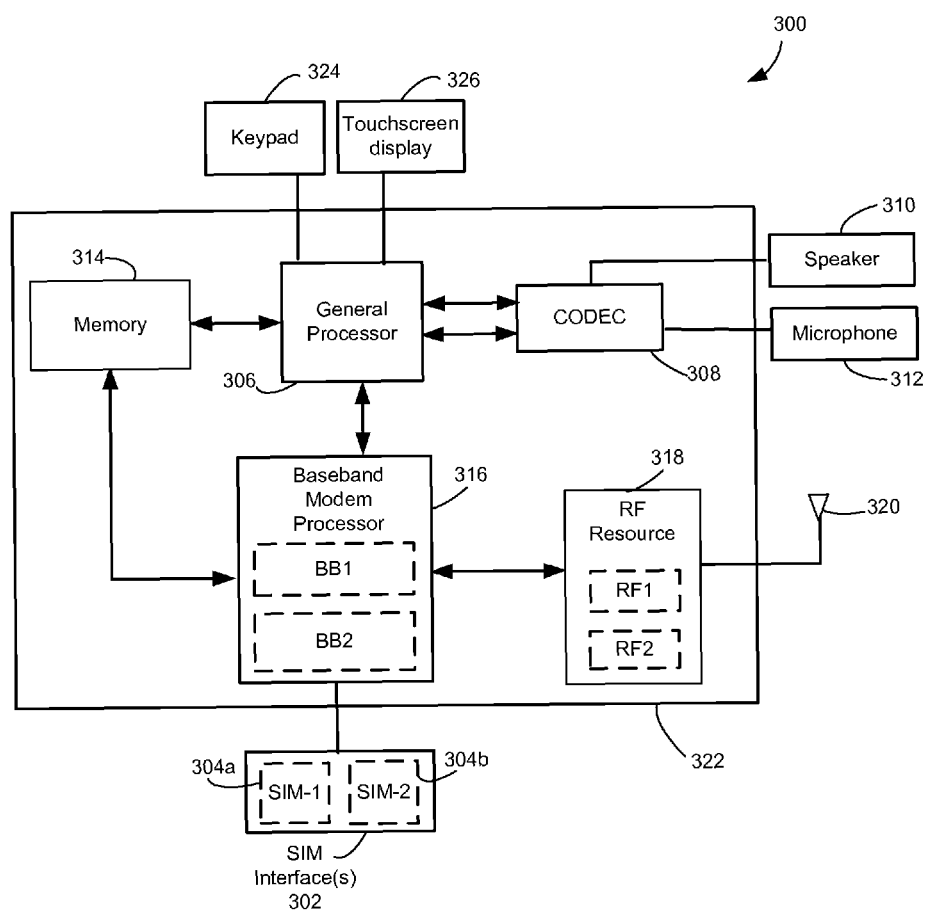
FIG. 3 is a block diagram illustrating a wireless communication device according to various embodiments.

FIG. 3 is a functional block diagram of an example wireless communication device 300 that is suitable for implementing various embodiments. With reference to FIGS. 1-3, according to various embodiments the wireless device 300 may be similar to one or more of the wireless devices 102, 202. In various embodiments, the wireless device 300 may be a single-SIM device, or a multi-SIM device, such as a dual-SIM device. In an example, the wireless device 300 may be a dual-SIM dual active (DSDA) device or a dual-SIM dual standby (DSDS) device. The wireless device 300 may include at least one SIM interface 302, which may receive a first identity module SIM (SIM-1) 304a that is associated with a first subscription. In some embodiments, the at least one SIM interface 302 may be implemented as multiple SIM interfaces 302, which may receive at least a second identity module SIM (SIM-2) 304b that is associated with at least a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 304a, 304b may have a CPU, ROM, RAM, EEPROM and I/O circuits. One or more of the SIMs 304a, 304b used in various embodiments may contain user account information, an IMSI a set of SIM application toolkit (SAT) commands and storage space for phone book contacts. One or more of the SIMs 304a, 304b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on one or more SIM 304 for identification.

The wireless device 300 may include at least one controller, such as a general purpose processor 306, which may be coupled to a coder/decoder (CODEC) 308. The CODEC 308 may in turn be coupled to a speaker 310 and a microphone 312. The general purpose processor 306 may also be coupled to at least one memory 314. The memory 314 may be a non-transitory tangible computer readable storage medium that stores processor-executable instructions. For example, the instructions may include routing communication data relating to a subscription though a corresponding baseband-RF resource chain. The memory 314 may store operating system (OS), as well as user application software and executable instructions.

The general purpose processor 306 and memory 314 may each be coupled to at least one baseband modem processor 316. Each SIM 304 in the wireless device 300 may be associated with a baseband-RF resource chain that includes a baseband modem processor 316 and a radio resource/RF resource 318. In some embodiments, the wireless device 300 may be a DSDS device and both SIMs 304a, 304b may share a single baseband-RF resource chain. For example, such shared baseband-RF resource chain may include the baseband modem processor 316 and RF resource 318. In other embodiments, the wireless device 300 may be a DSDA device and each SIM 304 may be associated with a separate baseband-RF resource chain. For example, such separate baseband RF resource chains may each include separate baseband modem processor 316 functionality (e.g., BB1 and BB2) and RF resource 318 functionality (e.g., RF1 and RF2). The RF resource(s) 318 may be coupled to at least one antenna 320, and may perform transmit/receive functions for the wireless services associated with each SIM 304 of the wireless device 300. The RF resource(s) 318 may provide separate transmit and receive functionality, or may include a transceiver that combines transmitter and receiver functions.

In particular embodiments, the general purpose processor 306, memory 314, baseband modem processor(s) 316, and RF resource(s) 318 may be included in a system-on-chip device 322. The first and second SIMs 304a, 304b and their corresponding interface(s) 302 may be external to the system-on-chip device 322. Further, various input and output devices may be coupled to components of the system-on-chip device 322, such as interfaces or controllers. Example user input components suitable for use in the wireless device 300 may include, but are not limited to, a keypad 324 and a touchscreen display 326.

In some embodiments, the keypad 324, touchscreen display 326, microphone 312, or a combination thereof, may perform the function of receiving the request to initiate an outgoing call. For example, the touchscreen display 326 may receive a selection of a contact from a contact list or receive a telephone number. In another example, either or both of the touchscreen display 326 and microphone 312 may perform the function of receiving a request to initiate an outgoing call. As another example, the request to initiate the outgoing call may be in the form of a voice command received via the microphone 312. Interfaces may be provided between the various software modules and functions in the wireless device 300 to enable communication between them, as is known in the art.

Figure 4:
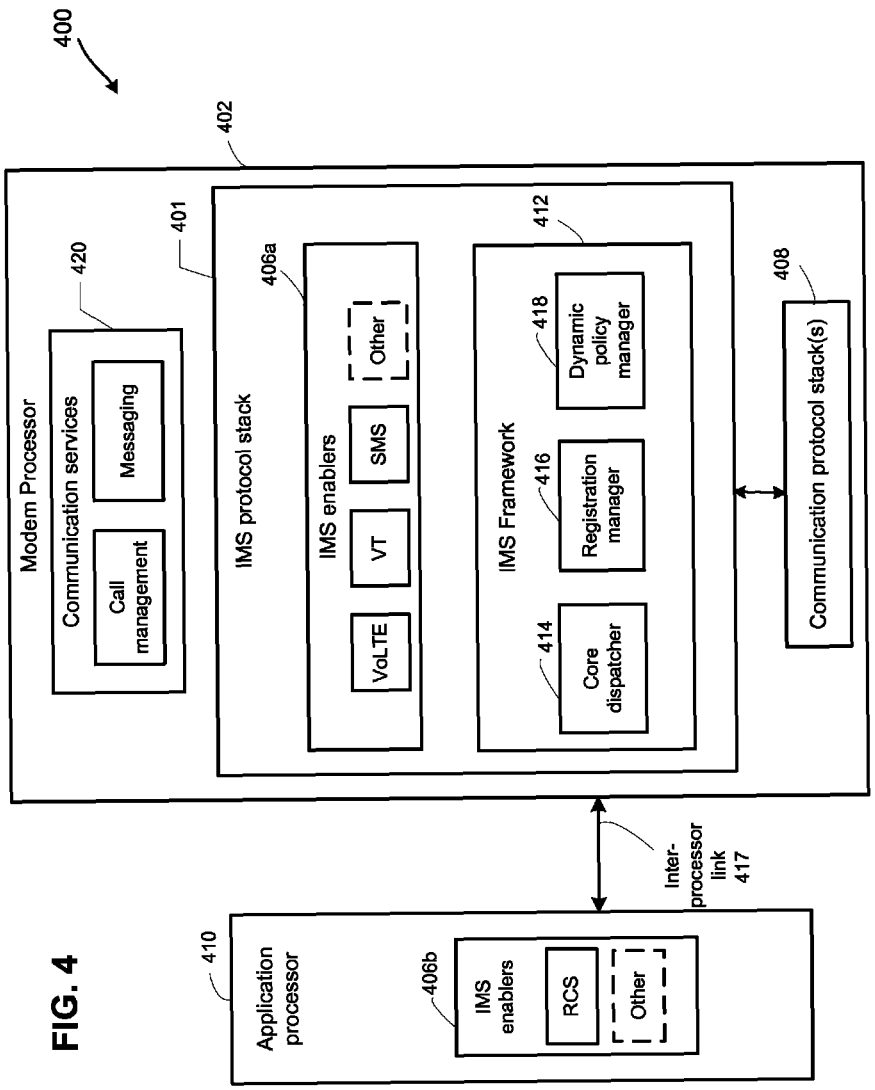
FIG. 4 is a block diagram illustrating an example software architecture in a wireless communication device according to various embodiments.

FIG. 4 is a functional block diagram of an example layered software architecture 400 implemented on a wireless device (e.g., wireless device 102, 202,300 in FIGS. 1-3) The layered software architecture 400 may include a Core IMS protocol stack 401 to run services over networks associated with one or more SIM. Referring to FIGS. 1-4, the software architecture on the wireless device may be distributed among one or more processors, with the Core IMS protocol stack 401 distributed among one or more modem processor 402, such as the baseband modem processor(s) 316. In various embodiments, the wireless device may be a single-SIM or dual-SIM wireless communication device, such as the wireless device 300.

In some embodiments, the Core IMS protocol stack 401 may be configured to support various services through the IMS network using enablers. In some embodiments, IMS enablers 406a for services that use conventionally radio-oriented multimedia ("radio-coupled services"), such as VoLTE, Voice over IP (VoIP), etc., may be provided on the modem processor 402 as part of the Core IMS protocol stack 401. Referring to FIGS. 1-4, IMS enablers 406b for services that use conventionally wireless/IP-oriented services ("data-centric services"), such as RCS, may be provided on an application processor 410, such as the general purpose processor 306.

The IMS enablers 406a, 406b may interact with one or more communication protocol stacks 408, which may include stacks associated with different radio access technologies. For example, a communication protocol stack 408 may be provided for each of various 2G/3G/4G access networks, for local and/or wide area networks (e.g., wireless local area network (WLAN)), etc.

The Core IMS protocol stack 401 may also include an IMS framework 412, including a core dispatcher 414 for handling data flows related to both radio-coupled services and data-centric services provided on the application processor 410. For example, the core dispatcher 414 may route messages and requests to one or more protocol stacks 408.

In various embodiments, messages and requests that are be handled by the core dispatcher 414 may be sent/received using a session initiation protocol (SIP). In some embodiments, the IMS framework 412 may also include a registration manager 416 and a dynamic policy manager 418. In various embodiments, the registration manager 416 may establish an IMS PDN connection during initialization of the modem processor 402. The IMS registration entity may also request establishment of an Internet/IP PDN in response to the triggering of dual registration for one or more IMS services. In the various embodiments, the dynamic policy manager 418 may be configured to maintain a cache of the operator policy information read from each SIM, may update the cached policy information in response to policy changes for each SIM, and/or may implement new or updated policies by triggering changes to the registration services of various services according to dynamic changes in conditions on the device (e.g., an over-the-air update, roaming, etc.)

In various embodiments, the core dispatcher 414 may provide a point of access for communication with an IMS server, such as the IMS 212, using a single or multiple IMS registrations. IMS services provided on the modem processor 402 and application processor 410 may each be registered in the IMS framework 412 using IMS feature tags. In various embodiments, the IMS feature tags may be used by the core dispatcher 414 to route data to applications and services.

IMS registration may involve the exchange of SIP messages to control communication sessions supporting services over IP, LTE and other data networks. SIP may be used for establishing, modifying, and terminating communications sessions, which may be used for various media streams that support services. Registration of IMS services may be performed by one or more entities of the Core IMS protocol stack 401. In some embodiments, enablers 406a, 406b may generate feature tags that identify corresponding IMS services, which may be identified by the registration manager 416. The registration manager 416 may trigger a request with the feature tags to be sent to the IMS server by the core dispatcher 414 through one or more communication protocols stacks 408. In some embodiments, feature tags generated by enablers 406b running on the application processor 410 may be sent to the registration manager 416 via an inter-processor link 417 between the application processor 410 and the modem processor 402.

The IMS server may provide a response to the registration request through one or more networks, which may be received on the modem processor 402 through the core dispatcher 414 and provided to the appropriate enablers 406a, 406b. Information from the registration response corresponding to the various radio-coupled and data-centric services may also be passed to the registration manager 416, which may maintain a list of registered IMS services.

In various embodiments, the modem processor 402 may also implement communication services 420, such as call management and wireless messaging services that may be provided within the modem processor 402.

In some embodiments, the software architecture implemented on the modem processor 402 may also include a hardware interface (not shown) between the communication protocol stack(s) 408 and the communication hardware (e.g., one or more RF transceivers). Further, one or more host layers (not shown) may be provided as an interface between the Core IMS protocol stack 401 and functions of the application processor 410. For example, the one or more host layers may provide data transfer services and/or application-specific functions.

In various embodiments, the modem processor 402 may be configured to execute software including additional protocol/modem stacks associated with one or more SIMs. Further, a particular SIM may be provisioned with information to execute different signaling procedures for IMS service registration and/or policy management a domain of the core network associated with these services and for handling data thereof.

The software architecture implemented by the modem processor 402 may be configured to connect to networks in any of a number of radio access technologies. While described with respect to LTE and/or WLAN networks, these are merely examples of networks that may be searched by radio resources associated with the modem processor in various embodiments.

Figure 5A:
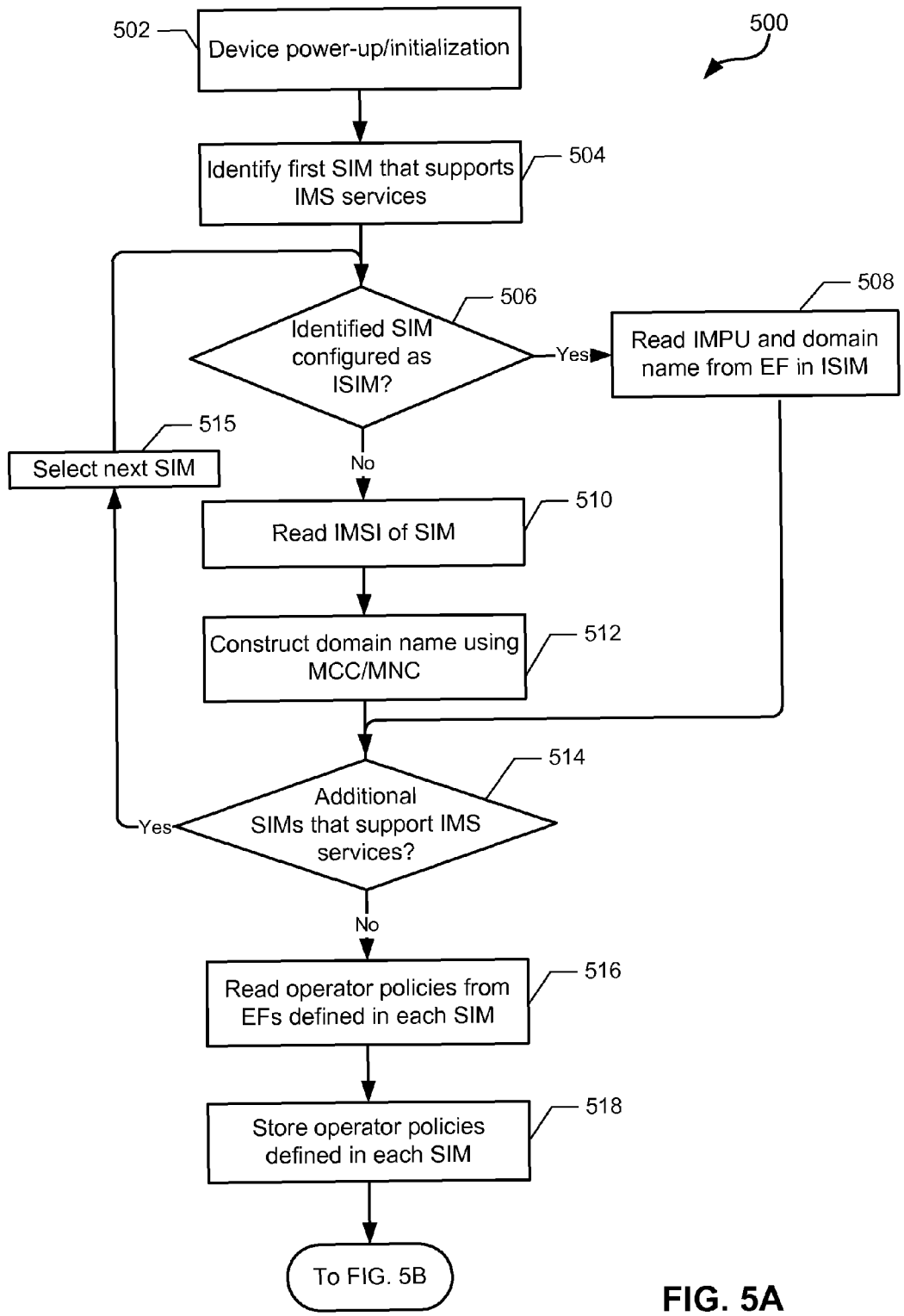
FIGS. 5A and 5B are process flow diagrams illustrating a method for managing multiple service registration options for one or more SIM on a wireless device according to various embodiments.
Figure 5B:
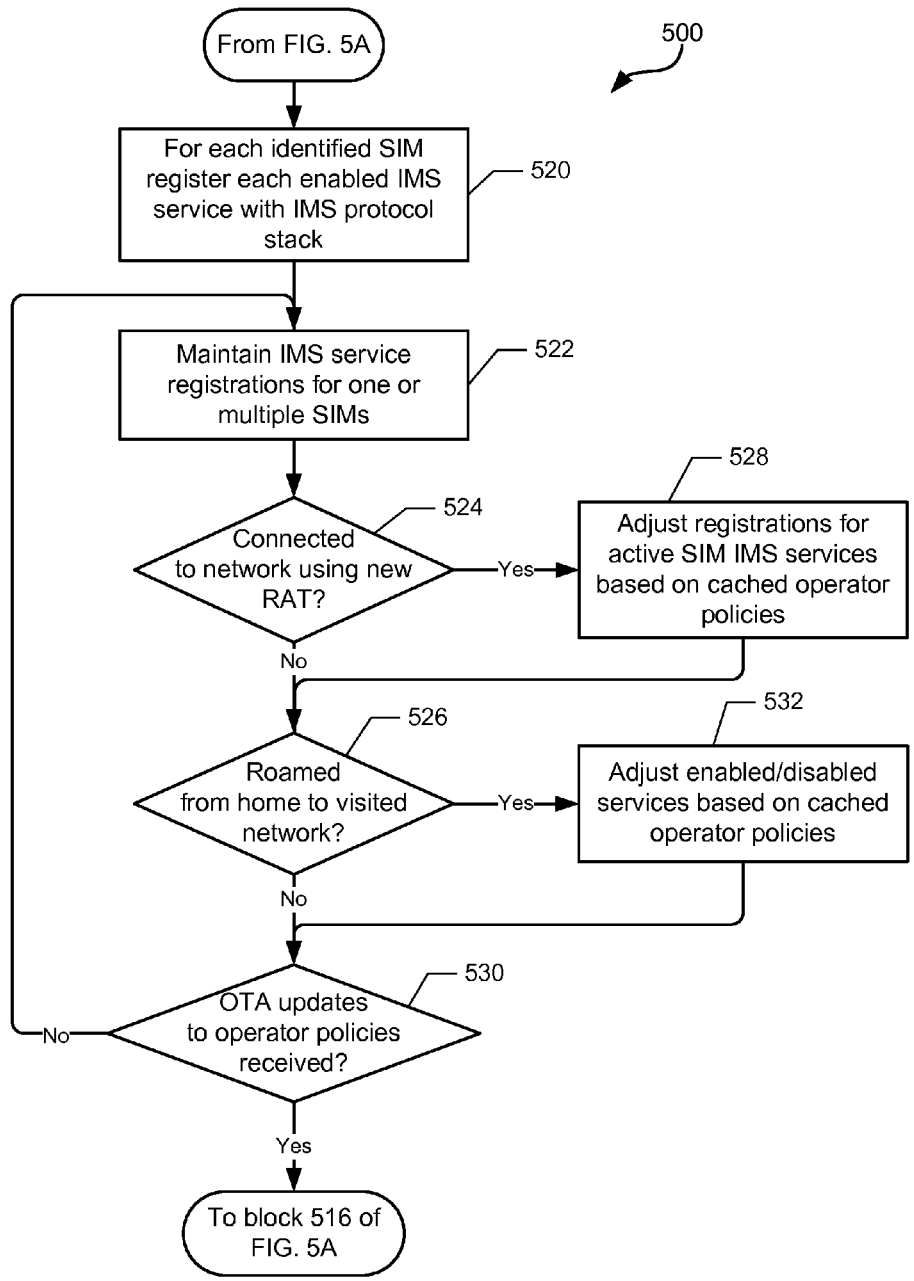

FIGS. 5A and 5B illustrate a method 500 for managing multiple service registration options for one or more SIM by a protocol stack on a wireless device according to various embodiments. With reference to FIGS. 1-5B, in various embodiments the operations of method 500 may be implemented by one or more control entities on one or more processor of the wireless device 300, such as the general purpose processor 306 and/or baseband modem processor(s) 316, or a separate controller (not shown) that may be coupled to the memory 314 and to the baseband modem processor(s) 316.

In block 502, the wireless device may be powered on, thereby initiating the wireless device processor and software architecture, including the Core IMS protocol stack 401. In block 504, the wireless device processor may identify a first SIM on the wireless device that supports IMS services. In determination block 506, the wireless device processor may determine whether the identified SIM is configured as an IP Multimedia Services Identity Module (ISIM). An ISIM is an application that may reside on a UICC, and is defined in the 3GPP TS 31.103 standard for providing access to the IMS Domain. An ISIM may contain at least an IP Multimedia Public Identity (IMPU) that is contactable by other users for IMS based services, an IP Multimedia Private Identity (IMPI) used to authenticate the device by its home IMS network, and a home operator domain name which provides information by which IMS routes registration requests from the wireless device to the Home IMS network.

In response to determining that the identified SIM is configured as an ISIM (i.e., determination block 506="Yes"), the wireless device processor may read the IMPU and home operator domain name from elementary files (EF) in which may be stored in the ISIM in block 508. The wireless device processor may proceed to determination block 514.

In response to determining that the identified SIM is not configured as an ISIM (i.e., determination block 506="No"), in block 510 the wireless device processor may read the IMSI of the identified SIM, which typically includes an mobile country code (MCC) portion and a mobile network code (MNC) portion. In block 512, the wireless device processor may derive the home operator domain name from the MCC and MNC according to a backward compatibility mechanism provided in the 3GPP TS 31.103 standard.

In determination block 514, the wireless device processor may determine whether there are any more SIMs that support IMS services identified on the wireless device, such as may be the case in a dual-SIM or multi-SIM device. In response to determining that there is an additional SIM that supports IMS services on the wireless device (i.e., determination block 514="Yes"), the wireless device processor select a next SIM in block 515 and return to determination block 506 to repeat the operations of determination block 506 through 512 as described for the selected SIM. Thus, the wireless device processor may repeat the operations of blocks 506 through 515 until all SIMs supporting IMS services have been read.

In response to determining that no more SIMs supports IMS services is identified on the wireless device (i.e., determination block 514="No"), the wireless device processor may read operator policies from additional EFs or other file types that may be defined in each SIM that supports IMS services in block 516. In block 518, the wireless device processor may store in temporary memory (e.g., cache) the operator policies defined in each identified SIM.

Continuing the method 500, in block 520 the wireless device processor may register each enabled IMS service with the Core IMS protocol stack 401, for each identified SIM, based on their defined operator policies. Such registration may be performed in a number of ways, and may involve one or more IMS registrations (e.g., as discussed in further detail with respect to FIG. 6). In block 522, the wireless device processor may maintain IMS service registrations for one or more SIMs on the wireless device. For example, in a dual-SIM device in which both SIMs support IMS services, registrations for the same, different, or overlapping services may be maintained for both SIMs.

In determination block 524, the wireless device processor may determine whether the wireless device has connected to a network using a new radio access technology (RAT) (e.g., switching from LTE to Wi-Fi, from Wi-Fi to LTE, etc.). In response to determining that the wireless device has connected to a network using a new RAT (i.e., determination block 524="Yes"), in block 528 the wireless device processor may adjust IMS registrations for services according to the operator policies for the active SIM that may have been stored in temporary/cache memory in block 518 (refer to FIG. 5A). For example, operator policies may include RAT requirements or preferences for one or more IMS services, which may result in a change in registration of those one or more services if the new RAT matches such requirements or preferences.

After adjusting IMS registrations for services for the active SIM in block 528 or in response to determining that the wireless device has connected to a network using a new RAT (i.e., determination block 524="No"), the wireless device processor may determine whether the wireless device has roamed to a visited network from a home network in determination block 526. In response to determining that the wireless device has roamed into the visited network (i.e., determination block 526="Yes"), the wireless device processor may adjust the services that are enabled and disabled based on the cached operator policies for the active SIM in block 532. For example, an operator may specify that certain IMS services become unavailable when a device is roaming, and therefore may be disabled on the device for that SIM.

After adjusting the services that are enabled and disabled based on the cached operator policies for the active SIM in block 532 or in response to determining that the wireless device has not roamed (i.e., determination block 526="No"), the wireless device processor may determine whether any over-the-air (OTA) update to the operator policies for the active SIM have been received in determination block 530. In response to determining that no OTA update has been received (i.e., determination block 530="No"), the wireless device processor may again read operator policies from EFs or other file types on each SIM block 516 (FIG. 5A). In response to determining that an OTA update has been received for the active SIM (i.e., determination block 530="No"), the wireless device processor may read operator policies from additional EFs or other file types that may be defined in each SIM that supports IMS services in block 516 in order to manage IMS services for more than one SIM supporting IMS services on the wireless device.

Figure 6:
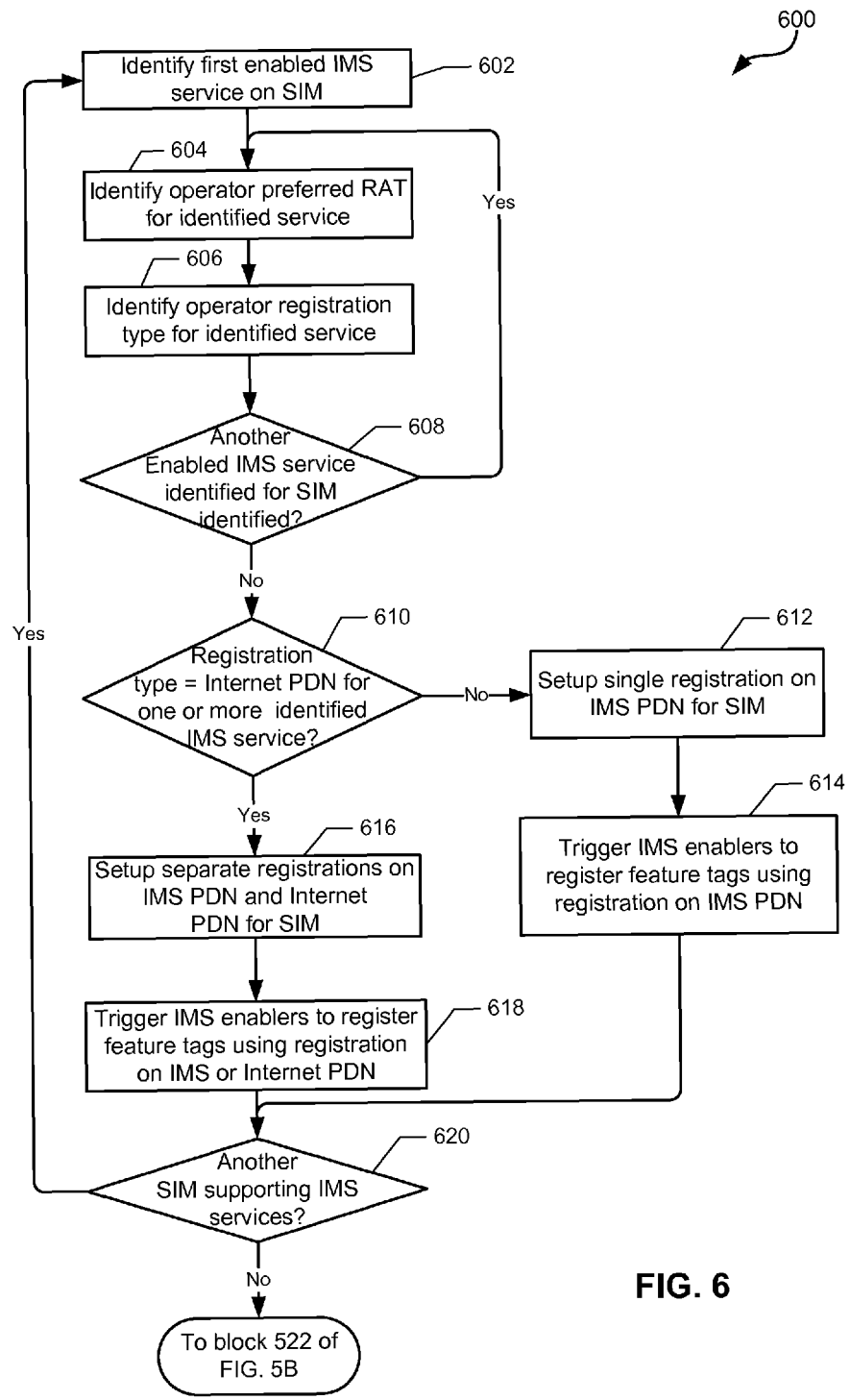
FIG. 6 is a process flow diagram illustrating a method of performing the steps in block 520 of FIG. 5B.

FIG. 6 illustrates an example method 600 of performing the operations of block 520 of the method 500 (refer to FIG. 5B) for an example identified SIM for which the operator policies have been read from the SIM and cached. With reference to FIGS. 1-6, the operations of the method 600 may be implemented by one or more control entities on one or more processor of the wireless device 300, such as the general purpose processor 306 and/or baseband modem processor(s) 316, or a separate controller (not shown) that may be coupled to memory and to the baseband modem processor(s) 316.

In block 602, the wireless device processor may identify a first enabled IMS service on the SIM. In block 604, the wireless device processor may identify the operator's preferred RAT (e.g., LTE, Wi-Fi, etc.) for the identified service, which may be provided in the operator-configured policies. In block 606, the wireless device processor may identify the registration type (e.g., IMS PDN or Internet PDN) for the identified service, which may be provided in the operator-configured policies. In determination block 608, the wireless device processor may determine whether another enabled IMS service is identified for the SIM. In response to determining that there is another enabled IMS service identified for the SIM (i.e., determination block 608="Yes"), the wireless device processor may repeat the operations of identifying the preferred RAT for the next identified service in block 604 and identifying the registration type for the next identified service in block 606 until all enabled IMS services for the SIM have been processed (i.e., until determination block 608="No").

In response to determining that no additional enabled IMS service is identified for the SIM (i.e., determination block 608="No"), the wireless device processor may determine whether the registration type for any of the identified IMS services on the SIM is an Internet PDN registration in determination block 610. In response to determining that no identified IMS service has a registration type requiring an Internet PDN (i.e., determination block 610="No"), the wireless device processor may setup a single registration for the IMS services on an IMS PDN on the SIM in block 612 and trigger IMS enablers for the services enabled on the SIM to register feature tags using the single registration on an IMS PDN in block 614. In various embodiments, the same Internet Protocol Security (IPSec) endpoint may be used by IMS enablers on both the modem processor (e.g., for radio-coupled services such as VoLTE, VT, etc.) and the application processor (e.g., for data-centric services such as RCS). In such embodiments, signaling messages may be routed to services on the application processor using inter-processor links. In this manner, IMS security on the modem processor may be extended to all IMS service registrations. The wireless device processor may proceed to determination block 620.

In response to determining that one or more identified IMS service has a registration type requiring an Internet PDN (i.e., determination block 610="Yes"), the wireless device processor may setup separate registrations on an IMS PDN and an Internet PDN (i.e., dual registration) in block 616. In block 618, the wireless device processor may trigger IMS enablers for services on the SIM to register feature tags using either the IMS PDN or the Internet PDN, depending on the registration type for their associated services. In various embodiments, a separate IPSec endpoint may be opened on the modem processor for the Internet PDN, which may be used by IMS enablers corresponding to services on the application processor (e.g., RCS) in which the operator policy registration type requires an Internet PDN. In such embodiments, service messages and signaling messages may be routed, using one or more inter-processor links, to the IMS enablers associated with services using Internet PDN on the application processor using inter-processor links. In this manner, security on the modem processor may be extended to all IMS service registrations.

In determination block 620, the wireless device processor may determine whether the wireless device is configured with another SIM that supports IMS services that has not been processed through the method 600. In response to determining that the wireless device is configured with another SIM that supports IMS services (i.e., determination block 620="Yes"), the wireless device processor may identify the first enabled IMS service on that SIM in block 602, and repeat the operations of blocks 604 through 618 on the that SIM as described. When all SIMs that support IMS services have been processed (i.e., determination block 620="No"), the wireless device processor may maintain IMS services for the one or more SIMs in block 522 of the method 500 (FIG. 5B) as described.

As discussed above, the references to first or second SIMs, radio resources, or first or second IMS services are arbitrary, and may apply to either or any SIM and/or radio resource of the wireless device. Such designations of SIMs and/or radio resources may be switched or reversed between instances of executing the methods herein.

Figure 7:
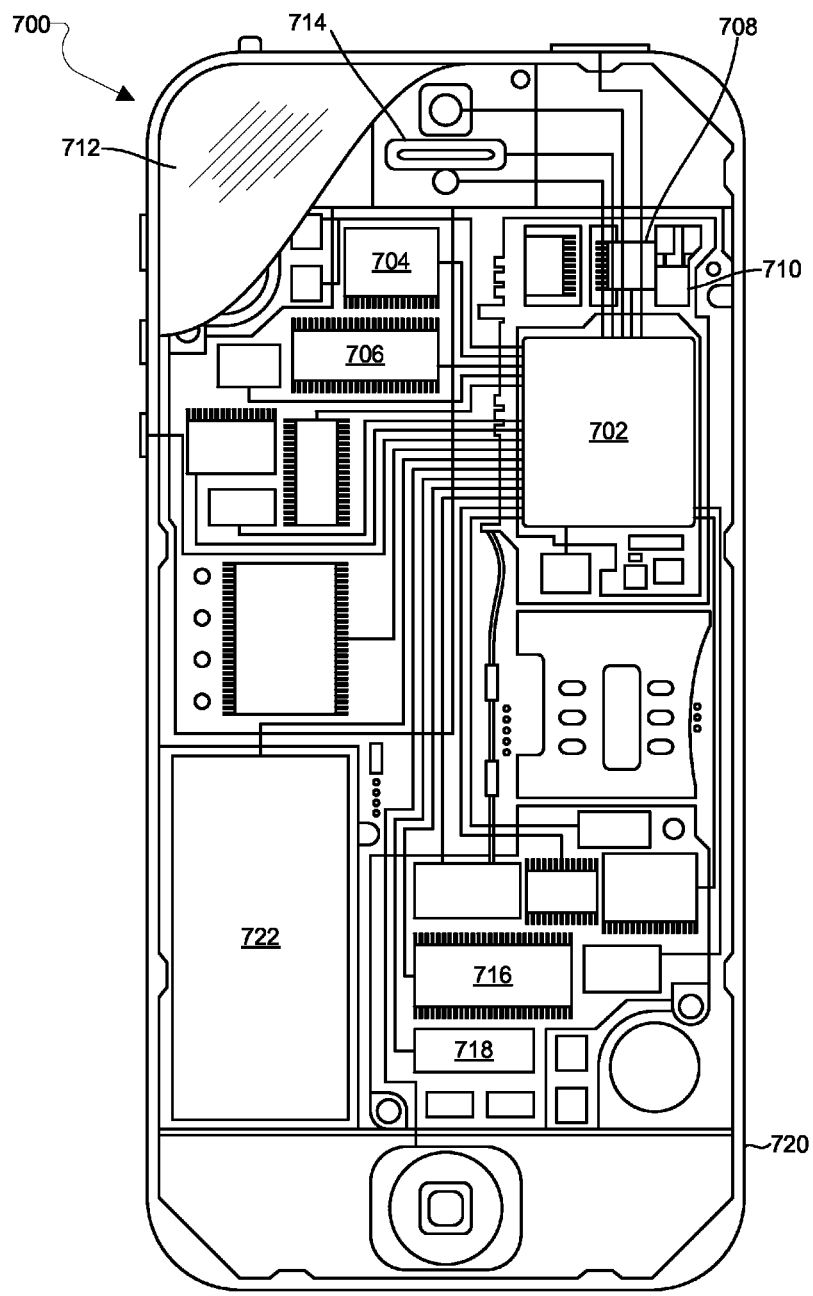
FIG. 7 is a component diagram of an example wireless device suitable for use with various embodiments.

Various embodiments (including, but not limited to, the embodiments discussed with reference to FIGS. 5A-6) may be implemented in any of a variety of wireless devices, an example of which is illustrated in FIG. 7. For example, the wireless device 700 (which may correspond, for example, to the wireless devices 102, 202, 300 in FIGS. 1-3) may include a processor 702 coupled to a touchscreen controller 704 and an internal memory 706. The processor 702 may be one or more multicore integrated circuits (ICs) designated for general or specific processing tasks. The internal memory 706 may be volatile or non-volatile memory, and may also be secure and/or encrypted memory, or unsecure and/or unencrypted memory, or any combination thereof.

The touchscreen controller 704 and the processor 702 may also be coupled to a touchscreen panel 712, such as a resistive-sensing touchscreen, capacitive-sensing touchscreen, infrared sensing touchscreen, etc. The wireless device 700 may have one or more radio signal transceivers 708 (e.g., Peanut®, Bluetooth®, Zigbee®, Wi-Fi, RF radio), for sending and receiving short-range RF signals coupled to the processor 702. The processor 702 may be coupled to a cellular network wireless transceiver, which may be in the form of a modem chip 716, that is coupled to an antennae 710 and that enables communications via a wide area network, such as a cellular network, according to any of the radio access technologies described herein.

The wireless device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown). The wireless device 700 may also include speakers 714 for providing audio outputs. The wireless device 700 may also include a housing 720, constructed of a plastic, metal, or a combination of materials, for containing all or some of the components discussed herein. The wireless device 700 may include a power source 722 coupled to the processor 702, such as a disposable or rechargeable battery.

Figure 8:
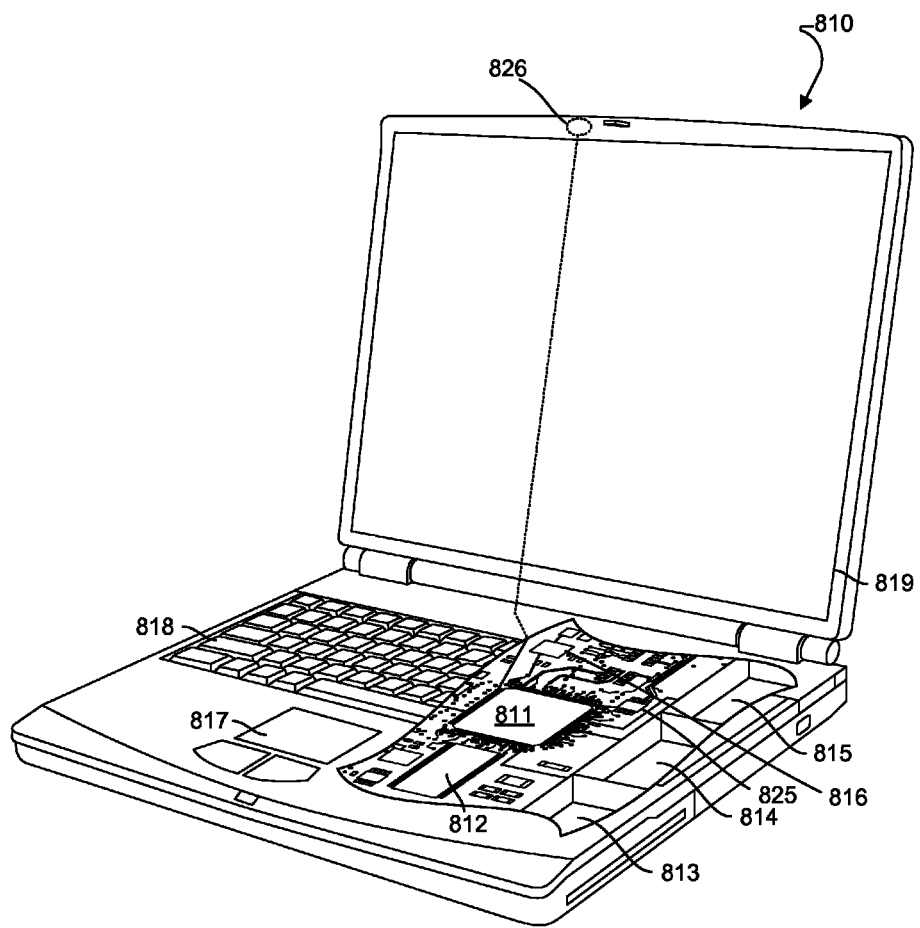
FIG. 8 is a component diagram of another example wireless device suitable for use with various embodiments.

Various embodiments (including, but not limited to, the embodiments discussed above with reference to FIGS. 5A-6) may also be implemented within a variety of personal computing devices, such as a laptop computer 800 (which may correspond, for example, to the wireless devices 102, 202, 300 in FIGS. 1-3) as illustrated in FIG. 8. Many laptop computers include a touchpad touch surface 817 that serves as the computer's pointing device, and thus may receive drag, scroll, and flick gestures similar to those implemented on wireless computing devices equipped with a touch screen display and described above. A laptop computer 800 will typically include a processor 811 coupled to volatile memory 812 and a large capacity nonvolatile memory, such as a disk drive 813 of Flash memory. The computer 800 may also include a floppy disc drive 814 and a compact disc (CD) drive 815 coupled to the processor 811. The computer 800 may also include a number of connector ports coupled to the processor 811 for establishing data connections or receiving external memory devices, such as a USB or FireWire® connector sockets, or other network connection circuits for coupling the processor 811 to a network. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be used in conjunction with various embodiments.

The processors 702 and 811 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 706, 812 and 813 before they are accessed and loaded into the processors 702 and 811. The processors 702 and 811 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 702, 811, including internal memory or removable memory plugged into the device and memory within the processor 702 and 811, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing Internet Protocol Multimedia Subsystem (IMS) service registrations on a wireless communication device having at least one subscriber identification module (SIM) that supports IMS services, the method comprising:
    accessing network operator policies stored in the at least one SIM;
    identifying enabled IMS services for each of the at least one SIM;
    identifying a registration type for each enabled IMS service on each of the at least one SIM, wherein the registration type is identified based on the accessed network operator policies;
    determining whether to perform a single registration or a dual registration for the at least one SIM;
    performing the determined registration using the accessed network operator policies; and
    maintaining registration of the enabled IMS services for each of the at least one SIM.

2. The method of claim 1, wherein:
    determining whether to perform a single registration or a dual registration for each of the at least one SIM is based on whether the registration type for any enabled IMS service on each of the at least one SIM requires an Internet packet data network (PDN).

3. The method of claim 2, wherein performing the determined registration comprises:
    setting up a single registration for a SIM in response to determining that the registration types for the enabled IMS services on the SIM do not require an Internet PDN; and
    setting up a dual registration on the SIM in response to determining that the registration type for at least one enabled IMS services on the SIM requires an Internet PDN.

4. The method of claim 3, wherein setting up the single registration comprises setting up a registration for the enabled IMS services on an IMS PDN, and wherein the method further comprises:
    triggering IMS enablers to register feature tags using the registration on the IMS PDN.

5. The method of claim 3, wherein setting up the dual registration comprises setting up each separate registrations on each of an IMS PDN and an Internet PDN, and wherein the method further comprises:
    triggering IMS enablers to register feature tags using the registration on at least one of the IMS PDN and the Internet PDN.

6. The method of claim 1, further comprising identifying roaming policies for each IMS service enabled on the at least one SIM based on the accessed network operator policies.

7. The method of claim 6, wherein maintaining registration of the enabled IMS services for each of the at least one SIM comprises:
determining whether the wireless device has roamed into a visited network; and
in response to determining that the wireless device has roamed into a visited network:
determining whether a roaming policy for one or more IMS services enabled on the at least one SIM is triggered by the visited network; and
adjusting the registration for the one or more IMS services in response to determining that the roaming policy for the one or more IMS services is triggered by the visited network.

8. The method of claim 1, further comprising identifying a preferred RAT for each IMS service enabled on the at least one SIM based on the accessed network operator policies.

9. The method of claim 8, wherein maintaining registration for the enabled IMS services for each of the at least one SIM comprises:
determining whether the wireless device has connected to a network using a new radio access technology (RAT) associated with an active SIM; and
in response to determining that the wireless device has connected to a network using the new radio access technology:
determining whether the new RAT matches a preferred RAT for one or more IMS service enabled on each of the at least one SIM; and
adjusting the registration for the one or more IMS service enabled on each of the at least one SIM in response to determining that the new RAT matches a preferred RAT for one or more IMS service enabled on each of the at least one SIM.

10. The method of claim 1, wherein maintaining registration for the enabled IMS services for each of the at least one SIM is performed by software running on a modem processor of the wireless communication device.

11. The method of claim 1, wherein maintaining registration of the enabled IMS services for each of the at least one SIM comprises:
determining whether the wireless device has received an over-the-air (OTA) update to network operator policies stored in the at least one SIM; and
repeating accessing the network operator policies stored in the at least one SIM and identifying a registration type for each enabled IMS service on the at least one SIM in response to determining that the wireless device has received an over-the-air (OTA) update to network operator policies stored in the at least one SIM.

12. The method of claim 1, wherein accessing network operator policies stored in the at least one SIM comprises identifying a domain name associated with the at least one SIM, wherein the domain name maps the at least one SIM to a corresponding network operator.

13. The method of claim 12, wherein identifying the domain name comprises:
determining whether any of the at least one SIM is configured as an Internet Protocol Multimedia Services Identity Module (ISIM); and
in response to determining that the at least one SIM is not configured as an ISIM:
reading an International Mobile Subscriber Identity (IMSI) from each of the at least one SIM; and
constructing the domain name using a mobile country code (MCC) and a mobile network code (MNC) derived from the IMSI.

14. The method of claim 13, further comprising:
reading a home operator domain name stored in the SIM in response to determining that the SIM is configured as an ISIM.

15. The method of claim 1, wherein accessing network operator policies stored in the at least one SIM comprises:
reading network operator policies from elementary files defined in the at least one SIM; and
storing the network operator policies read from the elementary files defined in the at least one SIM.

16. A wireless communication device, comprising:
a processor configured to be coupled to at least one subscriber identification module (SIM) that supports Internet Protocol Multimedia Subsystem (IMS) services, wherein the processor is configured with processor-executable instructions to:
access network operator policies stored in the at least one SIM;
identify enabled IMS services for each of the at least one SIM;
identify a registration type for each enabled IMS service on each of the at least one SIM, wherein the registration type is identified based on the accessed network operator policies;
determine whether to perform a single registration or a dual registration for the at least one SIM;
perform the determined registration using the accessed network operator policies; and
maintain registration of the enabled IMS services for each of the at least one SIM.

17. The wireless communication device of claim 16, wherein the processor is further configured with processor-executable instructions to determine whether to perform a single registration or a dual registration for each of the at least one SIM based on whether the registration type for any enabled IMS service on each of the at least one SIM requires an Internet packet data network (PDN).

18. The wireless communication device of claim 17, wherein the processor is further configured with processor-executable instructions to:
set up a single registration for a SIM in response to determining that the registration types for the enabled IMS services on the SIM do not require an Internet PDN; and
set up a dual registration on the SIM in response to determining that the registration type for at least one enabled IMS services on the SIM requires an Internet PDN.

19. The wireless communication device of claim 18, wherein the processor is further configured with processor-executable instructions to:
set up the single registration by setting up a registration for the enabled IMS services on an IMS PDN; and
trigger IMS enablers to register feature tags using the registration on the IMS PDN.

20. The wireless communication device of claim 18, wherein the processor is further configured with processor-executable instructions to:
set up the dual registration by setting up each separate registrations on each of an IMS PDN and an Internet PDN; and
trigger IMS enablers to register feature tags using the registration on at least one of the IMS PDN and the Internet PDN.

21. The wireless communication device of claim 16, wherein the processor is further configured with processor-executable instructions to maintain registration of the enabled IMS services for each of the at least one SIM by:
  determining whether the wireless device has roamed into a visited network; and
  in response to determining that the wireless device has roamed into a visited network:
    determining whether a roaming policy for one or more IMS services enabled on the at least one SIM is triggered by the visited network; and
    adjusting the registration for the one or more IMS services in response to determining that the roaming policy for the one or more IMS services is triggered by the visited network.

22. The wireless communication device of claim 21, wherein the processor is further configured with processor-executable instructions to identify a preferred RAT for each IMS service enabled on the at least one SIM based on the accessed network operator policies.

23. The wireless communication device of claim 22, wherein the processor is further configured with processor-executable instructions to maintain registration for the enabled IMS services for each of the at least one SIM by:
  determining whether the wireless device has connected to a network using a new radio access technology (RAT) associated with an active SIM; and
  in response to determining that the wireless device has connected to a network using the new radio access technology:
    determining whether the new RAT matches a preferred RAT for one or more IMS service enabled on each of the at least one SIM; and
    adjusting the registration for the one or more IMS service enabled on each of the at least one SIM in response to determining that the new RAT matches a preferred RAT for one or more IMS service enabled on each of the at least one SIM.

24. The wireless communication device of claim 16, wherein the processor is further configured with processor-executable instructions to maintain registration for the enabled IMS services for each of the at least one SIM by:
  determining whether the wireless device has received an over-the-air (OTA) update to network operator policies stored in the at least one SIM; and
  repeating accessing the network operator policies stored in the at least one SIM and identifying a registration type for each enabled IMS service on the at least one SIM in response to determining that the wireless device has received an over-the-air (OTA) update to network operator policies stored in the at least one SIM.

25. The wireless communication device of claim 16, wherein the processor is further configured with processor-executable instructions to access network operator policies stored in the at least one SIM by identifying a domain name associated with the at least one SIM, wherein the domain name maps the at least one SIM to a corresponding network operator.

26. The wireless communication device of claim 25, wherein the processor is configured with processor-executable instructions to identify the domain name by:
  determining whether any of the at least one SIM is configured as an Internet Protocol Multimedia Services Identity Module (ISIM); and
  in response to determining that at least one SIM is not configured as an ISIM:
    reading an International Mobile Subscriber Identity (IMSI) from each of the at least one SIM; and
    constructing the domain name using a mobile country code (MCC) and a mobile network code (MNC) derived from the IMSI.

27. The wireless communication device of claim 26, wherein the processor is further configured with processor-executable instructions to read a home operator domain name stored in the SIM in response to determining that the SIM is configured as an ISIM.

28. The wireless communication device of claim 16, wherein the processor is further configured with processor-executable instructions to access network operator policies stored in the at least one SIM by:
  reading network operator policies from elementary files defined in the at least one SIM; and
  storing the network operator policies read from the elementary files defined in the at least one SIM.

29. A wireless communication device, comprising:
  means for accessing network operator policies stored in at least one subscriber identification module (SIM) that supports Internet Protocol Multimedia Subsystem (IMS) services;
  means for identifying enabled IMS services for each of the at least one SIM;
  means for identifying a registration type for each enabled IMS service on each of the at least one SIM, wherein the registration type is identified based on the accessed network operator policies;
  means for determining whether to perform a single registration or a dual registration for the at least one SIM;
  means for performing the determined registration using the accessed network operator policies; and
  means for maintaining registration of the enabled IMS services for each of the at least one SIM.

30. A non-transitory processor-readable storage medium having stored thereon processor-executable instructions configured to cause a wireless communication device processor to perform operations comprising:
  accessing network operator policies stored in at least one subscriber identification module (SIM) that supports Internet Protocol Multimedia Subsystem (IMS) services;
  identifying enabled IMS services for each of the at least one SIM;
  identifying a registration type for each enabled IMS service on each of the at least one SIM, wherein the registration type is identified based on the accessed network operator policies;
  determining whether to perform a single registration or a dual registration for the at least one SIM;
  performing the determined registration using the accessed network operator policies; and
  maintaining registration of the enabled IMS services for each of the at least one SIM.

* * * * *